United States Patent
Mullinax et al.

(10) Patent No.: US 7,831,222 B1
(45) Date of Patent: Nov. 9, 2010

(54) METHOD AND APPARATUS FOR IMPROVING THE ISOLATION CHARACTERISTICS OF HD RADIO COMBINERS

(75) Inventors: Randall L. Mullinax, Gainesville, GA (US); Michael Gideon, Nashville, TN (US)

(73) Assignee: Clear Channel Management Services, Inc., San Antonio, TX (US)

( * ) Notice: Subject to any disclaimer, the term of this patent is extended or adjusted under 35 U.S.C. 154(b) by 1295 days.

(21) Appl. No.: 11/362,446

(22) Filed: Feb. 24, 2006

(51) Int. Cl.
*H04B 17/00* (2006.01)
*H01Q 11/12* (2006.01)

(52) U.S. Cl. .................. 455/115.1; 455/124; 455/103; 455/115.4; 455/67.11

(58) Field of Classification Search ............. 455/552.1, 455/67.11, 67.14, 115.1, 115.4, 121–125
See application file for complete search history.

(56) References Cited

U.S. PATENT DOCUMENTS

| | | | |
|---|---|---|---|
| 271,994 A | 2/1883 | Steward | |
| 3,166,725 A | 1/1965 | Engen | |
| 4,602,227 A * | 7/1986 | Clark et al. | 333/109 |
| 5,321,364 A * | 6/1994 | Nukiyama et al. | 324/601 |
| 5,548,809 A | 8/1996 | Lemson | |
| 5,606,283 A * | 2/1997 | Allen et al. | 330/124 R |
| 5,754,082 A * | 5/1998 | Swanson | 333/124 |
| 6,249,670 B1 * | 6/2001 | Kunkel et al. | 455/83 |
| 6,297,696 B1 | 10/2001 | Abdollahian et al. | |
| 6,384,695 B2 | 5/2002 | Kpodzo et al. | |
| 6,421,624 B1 | 7/2002 | Nakayama et al. | |
| 6,552,634 B1 * | 4/2003 | Raab | 333/216 |
| 6,765,929 B1 | 7/2004 | Cupo et al. | |
| 6,889,034 B1 * | 5/2005 | Dent | 455/102 |
| 6,933,986 B2 * | 8/2005 | Plonka | 348/732 |
| 7,082,320 B2 * | 7/2006 | Kattukaran et al. | 455/562.1 |
| 7,272,363 B1 * | 9/2007 | Fluker | 455/91 |
| 2001/0040486 A1 * | 11/2001 | Kpodzo et al. | 333/124 |
| 2002/0187759 A1 | 12/2002 | Stenberg | |
| 2006/0017521 A1 | 1/2006 | Downs | |

FOREIGN PATENT DOCUMENTS

WO PCTUS0644499 11/2006

OTHER PUBLICATIONS

R. Liebe & R. Surette, "Combining Digital and Analog Signals for US IBOC FM Broadcasting", Shiverly Labs, IEEE 2001.*
National Association of Broadcasters and Consumer Electronics Association, "In-Band/On-Channel Digital Radio Broadcasting Standard", NRSC-5, Apr. 2005, National Radio Systems Committee.

* cited by examiner

*Primary Examiner*—Duc M Nguyen
(74) *Attorney, Agent, or Firm*—Edward J. Marshall, Attorney at Law, PLLC

(57) ABSTRACT

A method and system are provided for improving the isolation characteristics of a combiner. In a system comprising a digital and analog radio signal combiner and a digital transmitter, an analog transmitter, an antenna, and a reject load coupled to the combiner, adjusting an impedance matching device coupled between the reject load and combiner so as to reduce the energy transmitted from the digital transmitter to the analog transmitter through the combiner.

21 Claims, 3 Drawing Sheets

METHOD AND APPARATUS FOR IMPROVING THE ISOLATION CHARACTERISTICS OF HD RADIO COMBINERS

FIELD

This invention relates generally to transmission of analog and digital radio signals.

BACKGROUND

Traditional terrestrial commercial radio broadcasters transmit an analog signal. However, use of a digital signal allows broadcasters to transmit more data in the same amount of bandwidth as an analog signal. Such digital audio broadcasting is therefore capable of providing listeners with a much higher audio quality and various additional information typically in the form of scrolling text on the radio receiver's display, such as traffic and weather reports, song titles and artist information, sports scores, and the like.

Among the standards proposed for providing digital radio service, the In-Band On-Channel ("IBOC") transmission method has gained acceptance for its ability to allow simultaneous transmission of analog and digital signals within the same channel. By using IBOC, a radio broadcaster avoids the need for additional frequency allocations. Accordingly, a listener with a digital radio receiver may tune to customary frequencies to receive digital broadcasts. The National Radio Systems Committee ("NRSC") promulgates an IBOC digital radio broadcasting standard, presently NRSC-5, that sets out the requirements for a system for broadcasting digital audio and ancillary digital data signals over AM and FM broadcast channels that may contain analog signals.

Broadcasters using IBOC digital radio broadcasting (commonly termed "HD Radio") transmit digital subcarrier signals in sidebands along with analog signals, or hybrid transmissions. FM IBOC, for example, creates a set of upper and lower sidebands on each side of the analog carrier frequency. Those hybrid transmissions, including any noise and spuriously generated signals such as phase noise and intermodulation products, generally must fit within a spectral mask, for example, the spectral mask specified by the NRSC for hybrid transmissions. FIG. 1 illustrates one such spectral mask 1 for an FM hybrid transmission within which the analog carrier frequency 2 and the upper and lower digital sidebands 3 of the hybrid transmission appear.

Broadcasters rely on a number of different methods for HD Radio implementation. For FM HD Radio, for example, one such method, known as "High-Level" Combined HD Radio, involves separately creating and amplifying analog and digital signals, combining those signals and feeding them to a common antenna, such as in the system illustrated in FIG. 2. In FIG. 2, a combiner 10 (also known as an injector) may receive at the analog RF input port 11 an analog signal from an analog FM transmitter 12 and receive at the digital RF input port 13 a digital signal from a digital FM transmitter 14, combine the analog and digital signals and feed the hybrid signal to an antenna 16 through the antenna output port 15. The process of combining analog and digital signals generally results in substantial RF energy loss, which is dissipated to a reject load 18 through the reject load output port 17. For a 10 dB combiner, for example, such losses are normally at about 0.5 dB between the analog RF input port 11 and the antenna output port 15, and at about 10 dB between the digital RF input port 13 and the antenna output port 15. That is, the reject load 18 typically dissipates 90% of the digital signal and about 10% of the analog signal.

The combiner 10 may also isolate the analog and digital transmitters 12 and 14 to avoid the generation of spurious or intermodulation products. Typical combiners generally provide such isolation in the range of 30 to 45 dB. For example, according to the iBiquity Digital Corporation, an organization responsible for developing the IBOC standards promulgated by the NRSC, the minimum recommended isolation is 36 dB.

It has been found that a tube-type analog FM transmitter generally requires substantially more (at least 10 dB) isolation from a digital FM transmitter than solid-state analog FM transmitter. Approximately 30 dB of isolation from a tube-type analog FM transmitter into a solid-state digital FM transmitter, or from a tube-type digital FM transmitter into a solid-state analog FM transmitter is generally sufficient to avoid the generation of spurious or intermodulation products.

Typical combiners have been found to generally perform according to their manufacturers' specifications when all four ports, i.e., the analog RF input port, the digital RF input port, the antenna output port and the reject load output port, are terminated with precision 50Ω test loads. In that situation, the isolation characteristics of the combiner typically meet iBiquity's recommended 36 dB of isolation. However, isolation between the analog and digital RF input ports typically degrades significantly when the precision loads at the antenna output port and reject load output port are replaced with a typical FM broadcast antenna and reject load, respectively, due to the actual load impedance of the antenna and combiner imperfections. Such degradation typically reduces the isolation to below the recommended 36 dB. It has been found, for example, that the isolation from a digital solid-state FM transmitter into a tube-type analog FM transmitter is typically degraded to the point that intermodulation products produced by the analog transmitter fall outside the limits of the standard spectral mask of FIG. 1, as is illustrated in FIG. 3. In the spectral plot of FIG. 3, the intermodulation products 20 appear above and below the digital carriers 21 outside the spectral mask 22. Despite such degradation, though, the measured voltage standing wave ratio ("VSWR") of the FM antenna over a 400 kHz bandwidth is typically less than the maximum 1.2:1 ratio recommended by iBiquity, and the measured VSWR of the reject loads is typically less than the maximum 1.1:1 to 1.15:1 ratio range recommended by iBiquity. Ideally, the characteristic impedance of the antenna is equal to the characteristic impedance of the reject load (typically at about 50Ω), and the VSWR may be used to indicate how well matched those impedances are.

It is therefore desired to improve the isolation from a digital FM transmitter into an analog FM transmitter.

DETAILED DESCRIPTION

Figure 1:
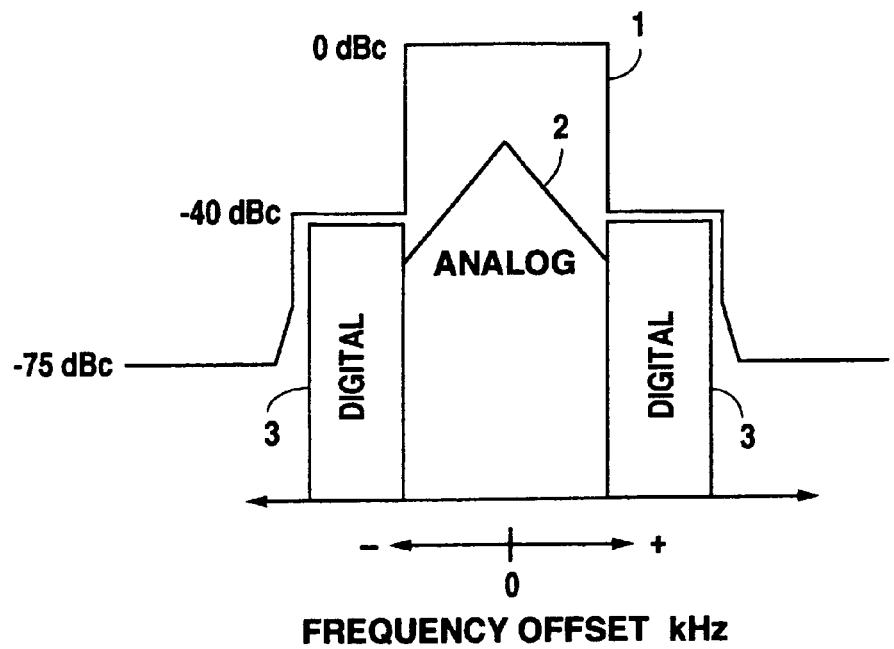
FIG. 1 illustrates a spectral mask for an FM channel and spectral representation of an IBOC hybrid FM transmission.
Figure 2:
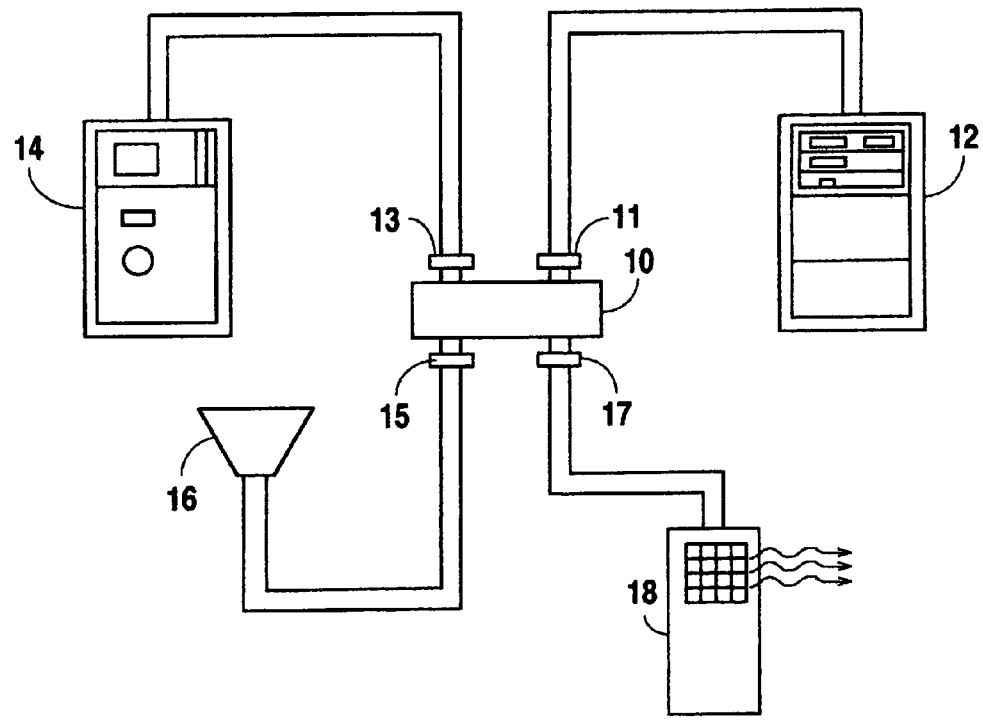
FIG. 2 illustrates a typical high-level combined HD Radio system.
Figure 3:
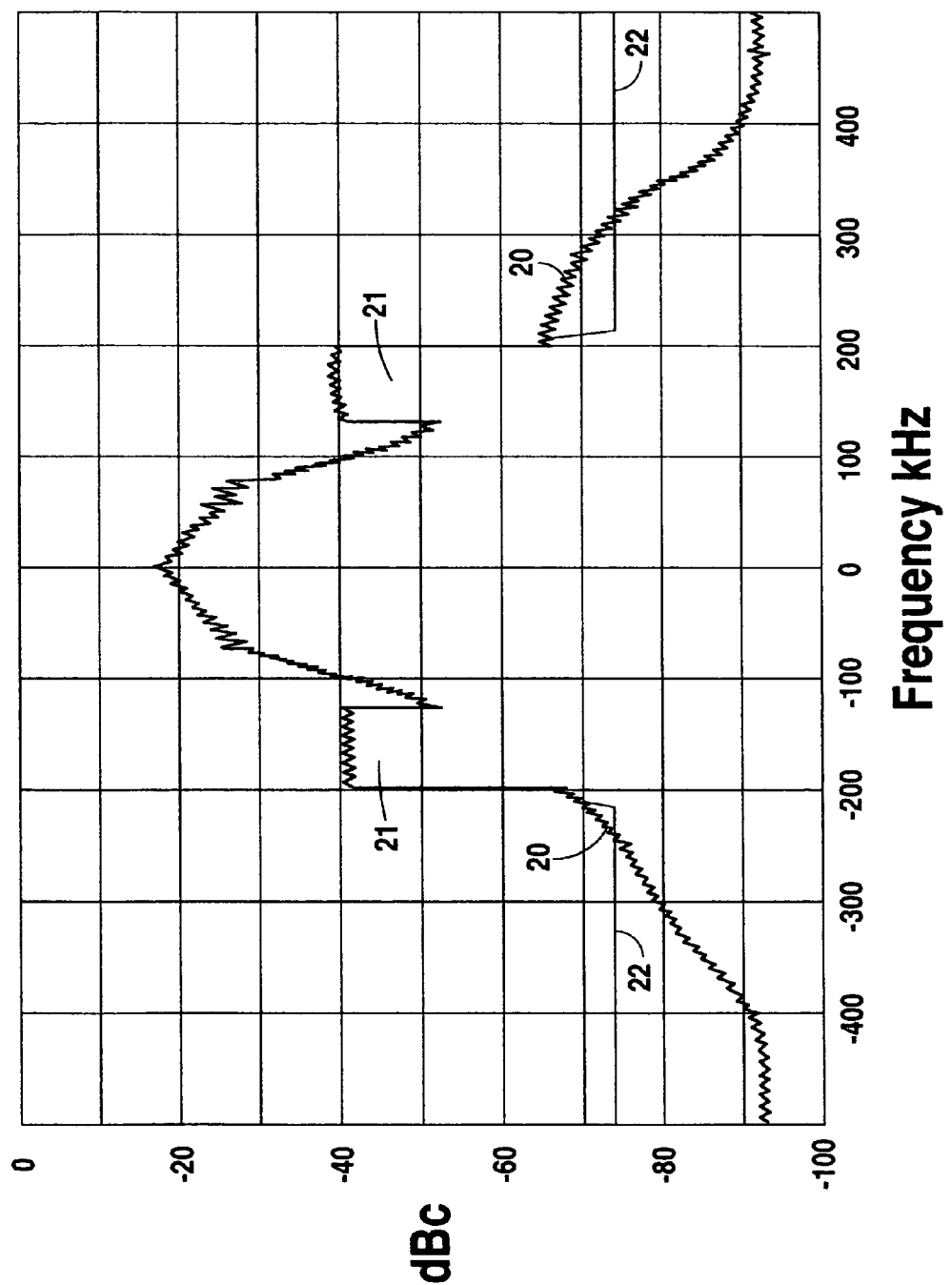
FIG. 3 illustrates a spectral plot against a spectral mask, the spectral plot showing intermodulation products resulting from poor isolation of digital and analog radio signal transmitters.
Figure 4:
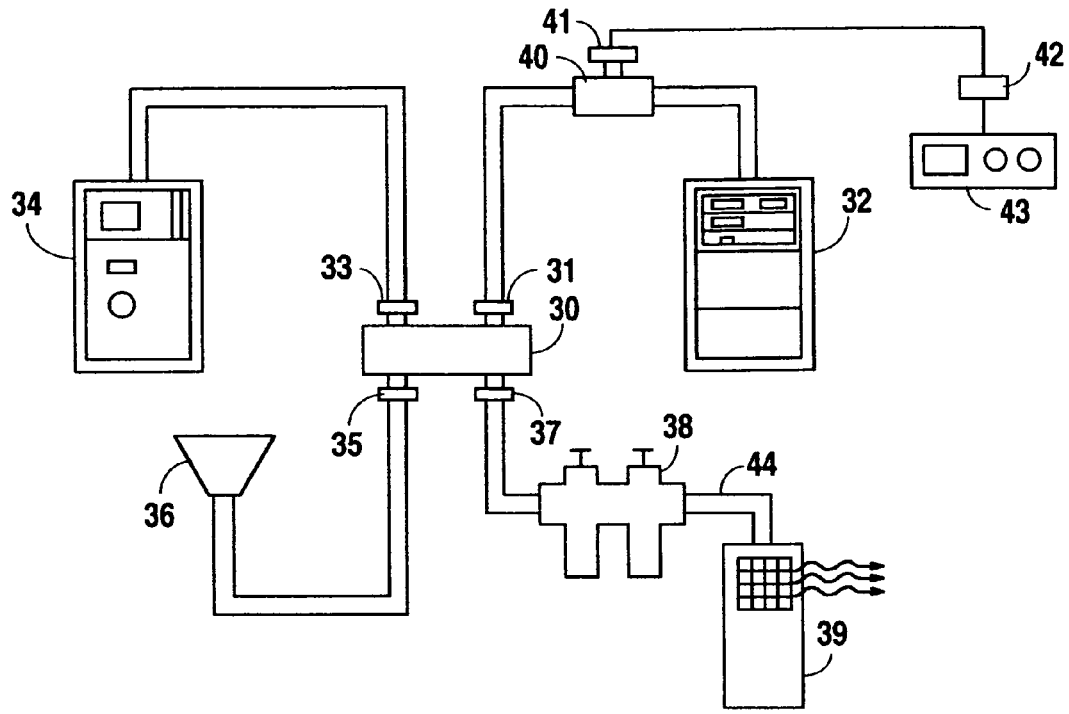
FIG. 4 illustrates one embodiment of a system utilizing an impedance-matching device to improve the isolation characteristics of a combiner.

Isolation may be improved by adjusting the reject load impedance to a value that, through the combiner, "balances" the load impedance presented by the FM antenna. That is, the reject load may be adjusted so as to maximize the combiner isolation. FIG. 4 illustrates one embodiment of an FM HD Radio transmission system configured for adjustment for maximum isolation. In the embodiment of FIG. 4, the system uses a typical 10 dB combiner 30 having a digital RF input port 33, an analog RF input port 31, a reject load output port 37 and an antenna output port 35. A tube-type analog transmitter 32 is coupled to the analog RF input port 31 through a first directional coupler 40, a solid-state digital transmitter 34 is coupled to the digital RF input port 33, a reject load 39 is coupled to the reject load output port 37 through an impedance matching device 38, and an antenna 36 is attached to the antenna output port 35. A spectrum analyzer 42 may be coupled to the reflected port 41 of the first directional coupler 40. An attenuator pad 42 may be used if further attenuation is needed for the spectrum analyzer 43. Those skilled in the art will appreciate that the term "coupled" includes both direct and indirect connections.

The impedance matching device 38 may be any device, such as a double-stub tuner, used to field tune an FM antenna, i.e., reduce the VSWR of an FM antenna. The impedance matching device 38 may be finely adjustable. Such devices typically may have considerable range, and may be suitable for changing the impedance of a reject load 39 when placed between the reject load output port 37 of the combiner 30 and the input of the reject load 39.

In the embodiment of FIG. 4, to determine the maximum feasible isolation of the combiner 30, the amplitude of the energy from the digital transmitter 34 into the analog transmitter 32 through the combiner 30 may be monitored via the spectrum analyzer 43 while the impedance matching device 38 is adjusted to minimize the amount of digital energy entering the analog transmitter 32. That method generally may compensate for any impact that the source impedances of the analog transmitter 32 or digital transmitters 34 have on the performance of the combiner 30. Once the optimal impedance at the reject load output port 37 of the combiner 30 has been determined, the impedance matching device 38 could be replaced with an insulator such as a steatite "doughnut" or metal sleeve of appropriate size placed on the inner conductor of the reject transmission line 44. In that way it may be possible to improve the isolation from the digital transmitter 34 in the analog transmitter 32 by approximately 10 dB.

Figure 5:
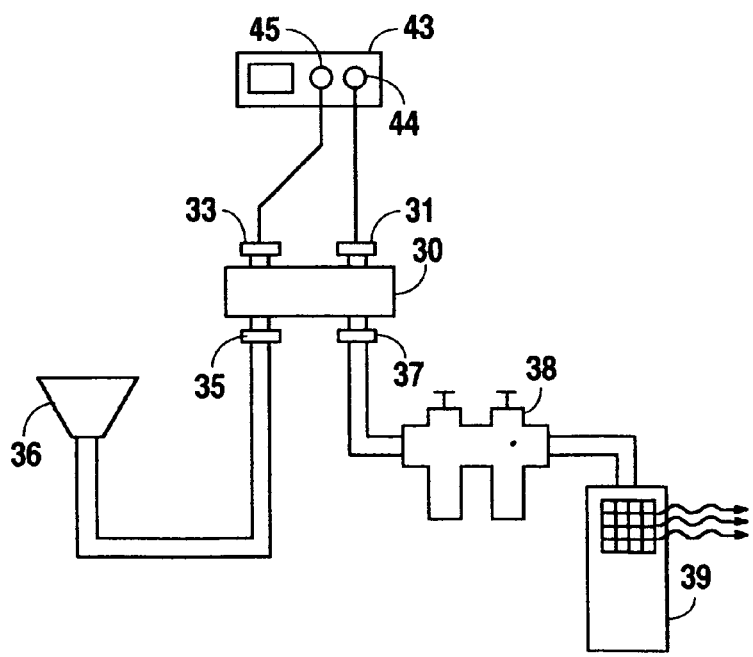
FIG. 5 illustrates adjustment of the impedance matching device of the embodiment of FIG. 4 by measuring the isolation between the digital RF input port and the analog RF input port of a combiner with a spectrum analyzer.

Alternatively, as shown in FIG. 5, adjustment of the impedance matching device 38 of FIG. 4 may be assisted by measuring the isolation between the digital RF input port 33 and the analog RF input port 31 of the combiner 30 with a spectrum analyzer 43 equipped with a tracking generator. As shown in FIG. 5, the RF input port 44 of the spectrum analyzer 43 may be coupled to the analog RF input port 31 of the combiner 30, and the tracking generator output port 45 of the spectrum analyzer 43 may be coupled to the digital RF input port 33 of the combiner 30. Adapters (not shown) may be used as required to couple the spectrum analyzer 43 to the analog RF input port 31 and digital RF port 33 of the combiner.

In another alternative, a network analyzer (not shown) may be used instead of the spectrum analyzer 43. The network analyzer may be similarly coupled to the combiner 30: the transmission/RF input port of the network analyzer may be coupled to the analog RF input port 31 of the combiner 30, and the reflection/RF output port of the network analyzer may be coupled to the digital RF input port 33 of the combiner 30. Adapters (not shown) may be used as required to couple the network analyzer to the analog RF input port 31 and digital RF port 33 of the combiner. Preferably, the network analyzer is set for s-parameter testing.

With reference again to FIG. 4, using the foregoing, the load impedance required to "balance" the combiner 30 to provide maximum isolation may not necessarily improve the impedance match at the reject load output port 37 of the combiner 30. As a result, the VSWR seen by the digital transmitter 34 may also increase since the load impedance presented to the digital transmitter 34 is primarily determined by the reject load 39 impedance (again, in a high-level combined system using a 10 dB combiner, approximately 90% of the energy from the digital transmitter is dissipated in the reject load). Those skilled in the art will appreciate that care may be taken to insure that the VSWR at the digital transmitter input port 33 of the combiner 30 is low enough that it does not cause the digital transmitter 34 to "fold back."

Those skilled in the art will also appreciate that the disclosed invention is not limited to use with "High-Level" Combined HD Radio systems. Similar isolation problems may also exist when using combiners with other coupling ratios, such as with the 3 dB, 4.33 dB and 6 dB combiners typically used in "Mid-Level" or "Split-Level" Combined FM HD Radio Systems. The methods described herein may also be used to achieve higher isolation between the digital and analog transmitters in those systems as well. Those skilled in the art will further appreciate that various terms used herein generally carry their ordinary and customary meaning, for example, as may be determined from the McGraw-Hill Dictionary of Scientific and Technical Terms, Sixth Edition.

We claim:

1. A method for improving transmitter isolation in a radio signal transmission system comprising a combiner for combining digital and analog radio signals, a digital radio signal transmitter coupled to said combiner, an analog radio signal transmitter coupled to said combiner, an antenna coupled to said combiner, and a reject load coupled to said combiner, said method comprising the steps of:
   a. coupling an impedance matching device between said reject load and said combiner; and
   b. adjusting said impedance matching device to reduce the energy transmitted from said digital signal transmitter to said analog signal transmitter through said combiner.

2. The method of claim 1, further comprising the steps of:
   a. coupling a spectrum analyzer between said analog signal transmitter and said combiner; and
   b. monitoring the output of said spectrum analyzer while performing said adjusting step so as to substantially minimize said transmitted energy.

3. The method of claim 2, further comprising the steps of
   a. removing said impedance matching device, leaving said reject load coupled to said combiner through a coupler; and
   b. placing an insulator around said coupler to substantially replace the impedance of said impedance matching device.

4. The method of claim 3, wherein said insulator comprises a steatite ring.

5. The method of claim 1, wherein said impedance matching device comprises a double stub tuner.

6. The method of claim 1, further comprising the steps of:
 a. coupling a spectrum analyzer to said combiner in place of said digital radio signal transmitter and said analog radio signal transmitter; and
 b. performing said adjusting step based on output from said spectrum analyzer.

7. The method of claim 1, further comprising the steps of:
 a. coupling a network analyzer to said combiner in place of said digital radio signal transmitter and said analog radio signal transmitter; and
 b. performing said adjusting step based on output from said network analyzer.

8. The method of claim 7, wherein said network analyzer is set for s-parameter testing.

9. A method comprising the steps of:
 a. transmitting a digital radio signal from a digital transmitter to a combiner for combining digital and analog radio signals;
 b. transmitting an analog radio signal from an analog transmitter to said combiner;
 c. dissipating part of said digital radio signal and part of said analog signal to a reject load coupled to said combiner through an impedance matching device; and
 d. adjusting said impedance matching device so as to reduce the energy transmitted from said digital transmitter to said analog transmitter through said combiner.

10. The method of claim 9 further comprising the step of analyzing said energy using a spectrum analyzer coupled between said analog transmitter and said combiner.

11. The method of claim 10, wherein said adjusting step further comprises substantially minimizing said energy based on output from said spectrum analyzer.

12. The method of claim 11, further comprising the steps of:
 a. removing said impedance matching device;
 b. coupling said reject load to said combiner through a coupler; and
 c. placing an insulator around said coupler to substantially replace the impedance of said impedance matching device.

13. The method of claim 12, wherein said insulator comprises a steatite ring.

14. The method of claim 9, wherein said impedance matching device comprises a double stub tuner.

15. A system comprising:
 a. a combiner for combining digital and analog radio signals;
 b. a digital transmitter coupled to said combiner;
 c. an analog transmitter coupled to said combiner;
 d. an antenna coupled to said combiner; and
 e. a reject load coupled to a reject load port of said combiner through an impedance matching device.

16. The system of claim 15 further comprising a spectrum analyzer coupled between said analog transmitter and said combiner.

17. The system of claim 15, wherein said impedance matching device comprises a double stub tuner.

18. A system comprising:
 a. a combining means for combining digital and analog radio signals;
 b. a first transmitting means for transmitting a digital radio signal to said combining means;
 c. a second transmitting means for transmitting an analog radio signal to said combining means;
 d. a radiating means for radiating part of said digital and analog radio signals from said combining means;
 e. a dissipating means for dissipating from said combining means part of said digital and analog radio signals; and
 f. an adjusting means for reducing the energy transmitted from said first transmitting means to said second transmitting means through said combining means, said adjusting means coupled between said combining means and said dissipating means.

19. The system of claim 18, further comprising means for analyzing said energy.

20. A system comprising:
 a. a combiner for combining digital and analog radio signals;
 b. a digital transmitter coupled to said combiner;
 c. an analog transmitter coupled to said combiner;
 d. an antenna coupled to said combiner;
 e. a reject load coupled to said combiner through a coupler; and
 f. an insulator surrounding said coupler.

21. The system of claim 20, wherein said insulator comprises a steatite ring.

* * * * *